US012601440B2

(12) United States Patent　　　　　(10) Patent No.:　US 12,601,440 B2
D'Amico et al.　　　　　　　　　　　　　(45) Date of Patent:　　Apr. 14, 2026

(54) SYSTEM TO CONVEY A FLUID

(71) Applicant: SAIPEM S.P.A., Milan (IT)

(72) Inventors: Amerigo D'Amico, Milan (IT); Enrico La Sorda, Milan (IT); Raymond Hallot, Milan (IT); Renzo Roldi, Milan (IT)

(73) Assignee: SAIPEM S.P.A., Milan (IT)

( * ) Notice: Subject to any disclaimer, the term of this patent is extended or adjusted under 35 U.S.C. 154(b) by 598 days.

(21) Appl. No.: 18/031,238

(22) PCT Filed: Oct. 15, 2021

(86) PCT No.: PCT/IB2021/059527
§ 371 (c)(1),
(2) Date: Apr. 11, 2023

(87) PCT Pub. No.: WO2022/079689
PCT Pub. Date: Apr. 21, 2022

(65) Prior Publication Data
US 2023/0383884 A1　　Nov. 30, 2023

(30) Foreign Application Priority Data
Oct. 16, 2020　　(IT) .......................... 102020000024460

(51) Int. Cl.
*F16L 53/37*　　　(2018.01)
*F16L 9/18*　　　(2006.01)

(52) U.S. Cl.
CPC ................. *F16L 53/37* (2018.01); *F16L 9/18* (2013.01)

(58) Field of Classification Search
CPC ............ F16L 53/37; F16L 59/143; F16L 9/18
(Continued)

(56) References Cited

U.S. PATENT DOCUMENTS 4,590,971 A * 5/1986 Webster ................ F16L 59/143
138/DIG. 6
4,645,906 A * 2/1987 Yagnik ................... F16L 53/34
219/541
(Continued)

FOREIGN PATENT DOCUMENTS

FR　　　3083841　　　1/2020
GB　　　2480072　　　11/2011
(Continued)

OTHER PUBLICATIONS

Notification Concerning Submission, Obtention or Transmittal of Priority Document for International Application No. PCT/IB2021/059527 dated Oct. 22, 2021.
(Continued)

*Primary Examiner* — Sang Y Paik
(74) *Attorney, Agent, or Firm* — Neal, Gerber & Eisenberg LLP

(57) ABSTRACT

A system to convey a fluid, in particular a fluid containing hydrocarbons, has a first pipeline, which is made of an electrically conductive material and has an internal diameter; a second pipeline, which is made of an electrically conductive material, has an external diameter smaller than the internal diameter, and is placed inside the first pipeline at a distance from the first pipeline so as to form an annular gap between the first and second pipeline; an electrically conductive layer placed in the annular gap at a distance from the first pipeline; an electrically insulating layer placed between the second pipeline and the electrically conductive layer; and a power source to apply an electrical potential difference between the second pipeline and the electrically conductive layer.

19 Claims, 6 Drawing Sheets

(58) Field of Classification Search
USPC .......................................................... 392/311
See application file for complete search history.

(56) References Cited

U.S. PATENT DOCUMENTS

| | | | |
|---|---|---|---|
| 6,142,707 A | 11/2000 | Bass et al. | |
| 6,292,627 B1* | 9/2001 | Gilchrist, Jr. ........... | F16L 53/37 |
| | | | 392/311 |
| 10,221,983 B2 | 3/2019 | Hoffmann | |
| 2004/0060693 A1* | 4/2004 | Bass ........................ | F16L 53/37 |
| | | | 166/57 |
| 2021/0301964 A1* | 9/2021 | Hallot ..................... | F16L 53/37 |
| 2022/0252198 A1* | 8/2022 | Gentil ................... | F16L 59/143 |

FOREIGN PATENT DOCUMENTS

| | | |
|---|---|---|
| WO | WO 2015/148162 | 10/2015 |
| WO | WO 2016/125024 | 8/2016 |

OTHER PUBLICATIONS

International Search Report and Written Opinion for International
Application No. PCT/IB2021/059527 dated Jan. 24, 2022.
Five Notifications of the Recording of a Change for International
Application No. PCT/IB2021/059527.

\* cited by examiner

SYSTEM TO CONVEY A FLUID

PRIORITY CLAIM

This application is a national stage application of PCT/IB2021/059527, filed on Oct. 15, 2021, which claims the benefit of and priority to Italian Patent Application No. 102020000024460, filed on Oct. 16, 2020, the entire contents of which are each incorporated by reference herein.

TECHNICAL FIELD

The present disclosure relates to a system to convey a fluid, in particular a fluid containing hydrocarbons.

In more detail, the present disclosure refers to a system to convey a fluid of the "pipe-in-pipe" type, used to convey hydrocarbons in a body of water, without thereby limiting the wide range of possible uses of the present disclosure.

BACKGROUND

Generally, the operations for the extraction and production of hydrocarbons from a reservoir located in the bed of a body of water require the fluid extracted from the underwater reservoir being conveyed from the reservoir along conveyance systems comprising pipelines laid on the bed of the body of water and along further pipelines called "risers", which rise to the surface up to a surface infrastructure, such as a fixed platform or a floating plant.

The fluid extracted from the reservoir is typically a mixture of hydrocarbons and organic compounds of carbon and hydrogen that often also contain sulphur, nitrogen, oxygen, water and other unwanted compounds. Such a mixture may be either in a liquid or gaseous state or may contain both phases.

The flow of the fluid inside the pipelines must be guaranteed by keeping the fluid within an adequate thermodynamic range of pressure and temperature, outside of which some components tend to precipitate in solid deposits of hydrates and/or waxes that might clog the pipelines.

In particular, the conditions leading to the formation of hydrates and/or waxes must be avoided either in the case of continuous or partial rated production or during production start-up or shut-down, due to the loss of heat of the fluid to the environment.

Conventionally, certain of these drawbacks can be mitigated by thermal insulation of the pipeline and/or injection of chemical additives into the hydrocarbons.

Further alternatives traditionally used to solve such drawbacks provide for the use of systems to convey fluids of the "pipe-in-pipe" type (i.e., comprising two coaxial pipelines thermally insulated from each other by means of an annular gap between the two pipelines, in order to reduce heat losses).

In recent decades, the technological development has made it possible to exploit marginal underwater reservoirs (i.e., reservoirs that would not be economically viable with conventional technologies due to their particular conditions). By way of example, such marginal reservoirs have a long distance from the existing infrastructures (in the order of tens of kilometres), high depth of the bed of the body of water (over 2000 m), low reservoir temperature, very low ambient temperature. For said marginal reservoirs, specific solutions must be undertaken to keep the fluid in the appropriate thermodynamic range, either during normal production or during the production shut-down phases, when the fluid naturally tends to cool down.

As a result, a new approach has been adopted in recent decades, which consists of actively heating the conveying pipelines to ensure that the fluid remains at the desired temperature under all operating or standstill conditions.

The term "active heating" indicates the systems that supply energy to the fluid, thus differentiating themselves from the passive systems that merely store energy inside the pipelines through thermal insulation.

Active heating systems can use, for example, hot fluids circulating in heating pipes arranged around the conveying pipelines or the electrical heating of the conveying pipelines.

At present, the most widely adopted system is the electrical heating of the fluid conveying pipelines, which is based on heating due to ohmic losses of direct or induced currents. As is known, the electrical heating of the conveying pipelines can be of different types: (i) direct electrical heating, wherein an electrical current flows through the conveying pipelines themselves, heating the metal of the conveying pipelines by Joule effect; or (ii) electrical traced heating of the "pipe-in-pipe" type, wherein several electrical cables are laid on the external surface of an internal pipeline coaxially arranged within an external pipeline. The thermal power lost by the electrical cables due to the Joule effect is transferred to the internal piping with which they are in contact, thus heating the fluid. This system has relatively excellent thermal insulation and optimal thermal efficiency, but has a relatively complex mechanical design and relatively high installation costs.

As is known, the direct electrical heating of a system to convey a fluid can in turn be: (i) with open loop, wherein the current passes through a circuit comprising a conveying pipeline and a cable laid on the conveying pipeline itself. This solution is mechanically relatively simple, but has significant current losses as the conveying pipeline through which the current passes is in galvanic contact with the body of water; or (ii) of the "pipe-in-pipe" type, wherein the internal pipeline, used for conveying the fluid, and the external pipeline are integral parts of the electrical circuit. This system is characterised by relatively excellent thermal performance due to an important thermal insulation in the annular gap between the internal pipeline and the external pipeline. Although this system has no current losses in the body of water, the efficiency is limited as the current passing through the external pipeline makes no contribution to heating the fluid. In addition, the fact that the electrical circuit essentially comprises two coaxial pipelines requires special attention to the presence of contaminants in the annular gap, which can generate electrical discharges in the annular gap capable of damaging the thermal insulation and compromising the efficiency of the system.

Examples of "pipe-in-pipe" conveying systems with direct electrical heating are described in U.S. Pat. No. 6,142,707, PCT Patent Application No. WO 2015/148162 and FR Patent Document No. 3,083,841.

SUMMARY

An aim of the present disclosure is to realize a system to convey a fluid that mitigates certain of the drawbacks of certain of the prior art.

In accordance with the present disclosure, a system to convey a fluid, in particular a fluid containing hydrocarbons, is realized in which the system comprises: a first pipeline, which is made of an electrically conductive material and has an internal diameter; a second pipeline, which is made of an electrically conductive material, has an external diameter smaller than the internal diameter of the first pipeline, and is placed inside the first pipeline at a distance from the first pipeline so as to form an annular gap between the first and second pipeline; an electrically conductive layer, which is placed in the annular gap at a distance from the first pipeline and is in electrical contact with the first pipeline; an electrically insulating layer placed between the second pipeline and the electrically conductive layer; and a power source to apply an electrical potential difference between the second pipeline and the electrically conductive layer.

In accordance with the present disclosure, the electrically conductive layer and the second pipeline define two parts of the electrical circuit, limiting the heat losses in the body of water and consequently, increasing the efficiency of the system. In addition, the voltage in the annular gap is limited, thus ensuring a greater tolerance to any contaminants present in the annular gap.

In general, the first pipeline is also placed parallel to the electrically conductive layer and both are earthed. In this way, it is possible to limit the electrical potential difference between the first pipeline and the electrically conductive layer.

In addition, since the electrically conductive layer has a lower electrical impedance than the electrical impedance of the first pipeline, most of the electrical current will pass through the electrically conductive layer.

In particular, the system comprises a thermally insulating layer placed in the annular gap around the second pipeline. In this way, the heat generated by Joule effect in the second pipeline is kept as much as possible in the second pipeline wherein the fluid flows and makes the system particularly efficient, in terms of the energy balance.

In particular, the electrically insulating layer coats the second pipeline. This solution is particularly relatively practical and easy to implement based on the common pipeline coating machines.

In particular, the electrically conductive layer coats the electrically insulating layer.

In particular, the thermally insulating layer coats the electrically conductive layer. In this way, the heat generated by Joule effect by the electrically conductive layer is also largely directed to the second pipeline, which directly conveys the fluid. It follows that this technical solution is particularly efficient in terms of energy balance.

In accordance with an alternative embodiment of the present disclosure, the thermally insulating layer coats the electrically insulating layer.

In practice, this involves realizing two coatings in succession.

In accordance with the alternative embodiment, the electrically conductive layer coats the thermally insulating layer and faces directly the first pipeline.

In particular, the power source comprises a voltage generator. Depending on the length of the first and second pipelines, the electrical potential difference may be applied at several points along the longitudinal axis of the first and second pipelines and, in particular, along sections of the first and second pipelines of discrete length.

From a constructive point of view, the electrically conductive layer comprising a plurality of electrically conductive sheets, preferably of aluminium, placed side by side longitudinally in the annular gap between the first and second pipelines. The electrically conductive pipe-wound sheets are coupled together by welding or brazing or partial overlapping or first connecting elements that are electrically conductive. In this way, an electrically conductive layer is relatively easily realized.

With particular reference to the embodiment of the first and second pipelines, the system comprises a plurality of first pipes joined together at their opposite ends by first welding seams to form the first pipeline; a plurality of second pipes joined together at their opposite ends by second welding seams; and at least one second connecting element, which is arranged at each second welding seam, is made of an electrically conductive material, and is configured to electrically connect two electrically conductive sheets arranged at opposite sides with respect to the second welding seam. In this way, the electrical continuity of the first and second pipeline and of the electrically conductive sheet is ensured.

In particular, each connecting element is in contact with two electrically conductive sheets arranged at opposite sides with respect to the second welding seam.

In practice, each connecting element forms a connection bridge between two electrically conductive sheets spaced apart.

Alternatively, the system comprises at least two connecting elements, each of which is in contact with a respective electrically conductive sheet and with the first pipeline. In this way, the first pipeline becomes an integral part of the bridge.

In particular, the system comprises a sleeve wrapped around the second welding seam and the free ends of two adjacent pipes. In this way, the sleeve generally made of polymeric material, restores the continuity of the electrically insulating layer astride two adjacent pipes.

Advantageously, the system comprises a plurality of annular spacers arranged between the first and second pipelines to space the first and second pipeline and maintain the annular gap substantially constant; in particular, each annular spacer being arranged between the electrically conductive layer and the first pipeline. In this way, it is possible to center the first pipeline with respect to the second pipeline in a relatively simple and precise way.

In particular, the system comprises a plurality of annular shear stops placed between the first and the second pipeline to limit the relative longitudinal displacements between the first and second pipeline (i.e., the relative displacements along a direction substantially parallel to the longitudinal axis of the first and second pipeline). In other words, the annular shear stops have the function of absorbing part of the shear forces acting on the first and on the second pipeline.

In particular, each annular shear stop breaks the continuity of the electrically conductive layer, the system comprising a plurality of third connecting elements connected to the electrically conductive layer and the first pipeline at opposite sides of each annular shear stop.

This restores the electrical continuity of the electrically conductive layer.

In accordance with an alternative variant, each annular shear stop has openings to ensure the continuity of the annular gap along the longitudinal axis of the first and second pipeline. This makes it possible to lay cables or optical fibres in the annular gap for the transmission of signals.

BRIEF DESCRIPTION OF THE DRAWINGS

Other characteristics and advantages of the present disclosure will become clear from the following description of exemplary and non-limiting embodiments thereof, with reference to the enclosed figures wherein.

DETAILED DESCRIPTION

Figures 1, 2:
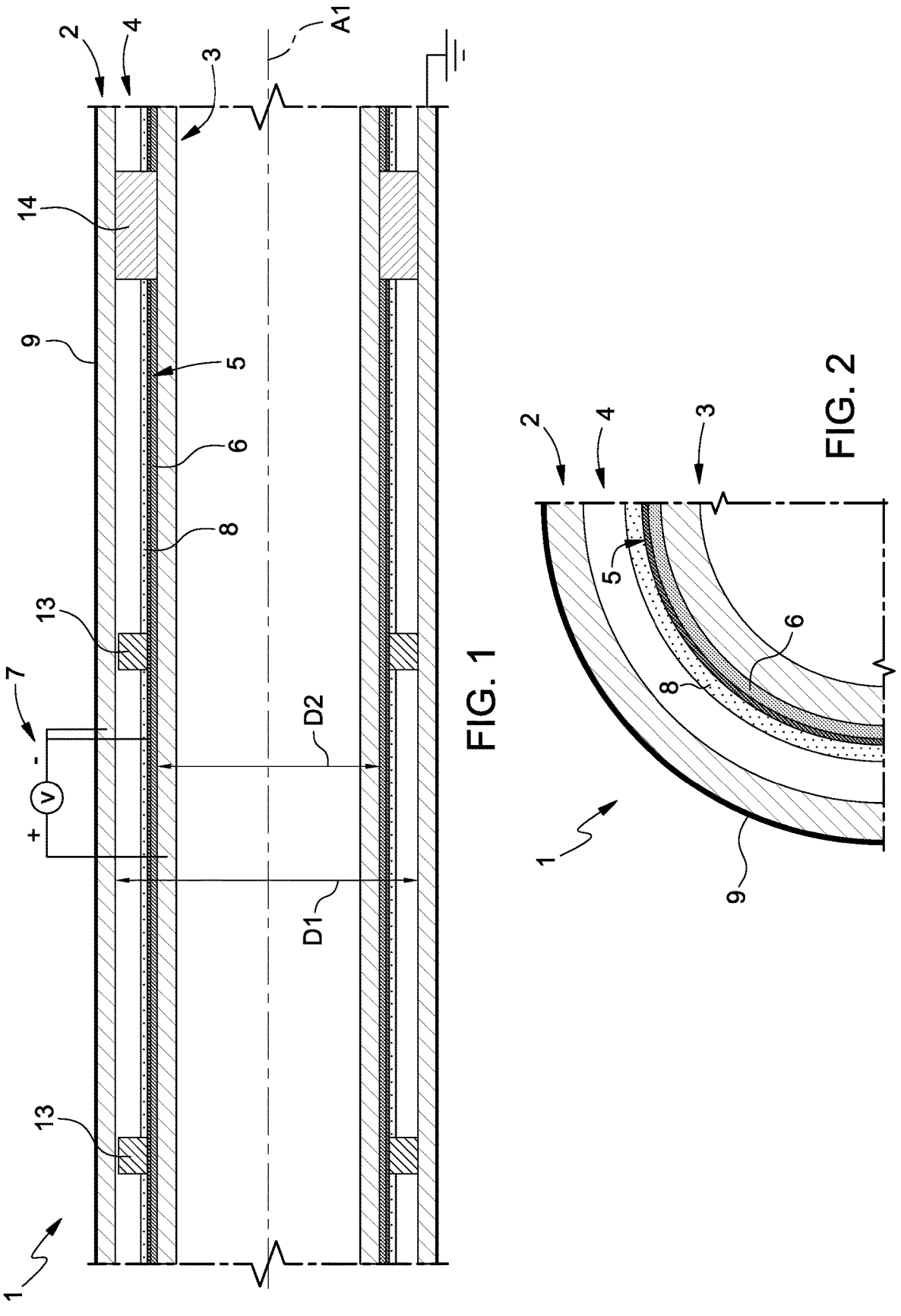
FIG. 1 is a longitudinal sectional view, with parts removed for clarity's sake, of a system to convey fluids realized in accordance with a first embodiment of the present disclosure.
FIG. 2 is a cross-sectional view, with parts removed for clarity's sake, of the system of FIG. 1.

With reference to FIGS. 1 and 2, 1 denotes as a whole a system to convey a fluid, in particular a fluid containing hydrocarbons. The system 1 is adapted to operate in a body of water at a relatively considerable depth and at relatively low temperature.

The system 1 comprises a pipeline 2, which extends along an axis A1, is made of an electrically conductive material, and has an internal diameter D1; a pipeline 3, which is substantially coaxial to the pipeline 2, is made of an electrical conductive material, has an external diameter D2 smaller than the internal diameter D1, and is placed or positioned inside the pipeline 2 at a distance from the pipeline 2 to form an annular gap 4 between the pipelines 2 and 3; an electrically conductive layer 5 placed or positioned in the annular gap 4 at a distance from the pipeline 2; an electrically insulating layer 6 placed or positioned between the pipeline 3 and the electrically conductive layer 5; and a potential power source 7 connected to the pipeline 3, to the electrically conductive layer 5 and to the pipeline 2. In certain embodiments, the electrically conductive layer 5 and the pipeline 2 are earthed and are at the same potential.

In practice, the electrically insulating layer 6 coats the external face of the pipeline 3 while the electrically conductive layer 5 coats the external face of the electrically insulating layer 6.

The system 1 comprises a thermally insulating layer 8 placed in the annular gap 4 around the second pipeline 3. In particular, the thermally insulating layer 8 coats the electrically conductive layer 5.

As shown in FIGS. 1 and 2, part of the annular gap 4 remains free and the pipeline 2 is provided with an external protective layer 9.

Figures 3, 4, 5, 6:
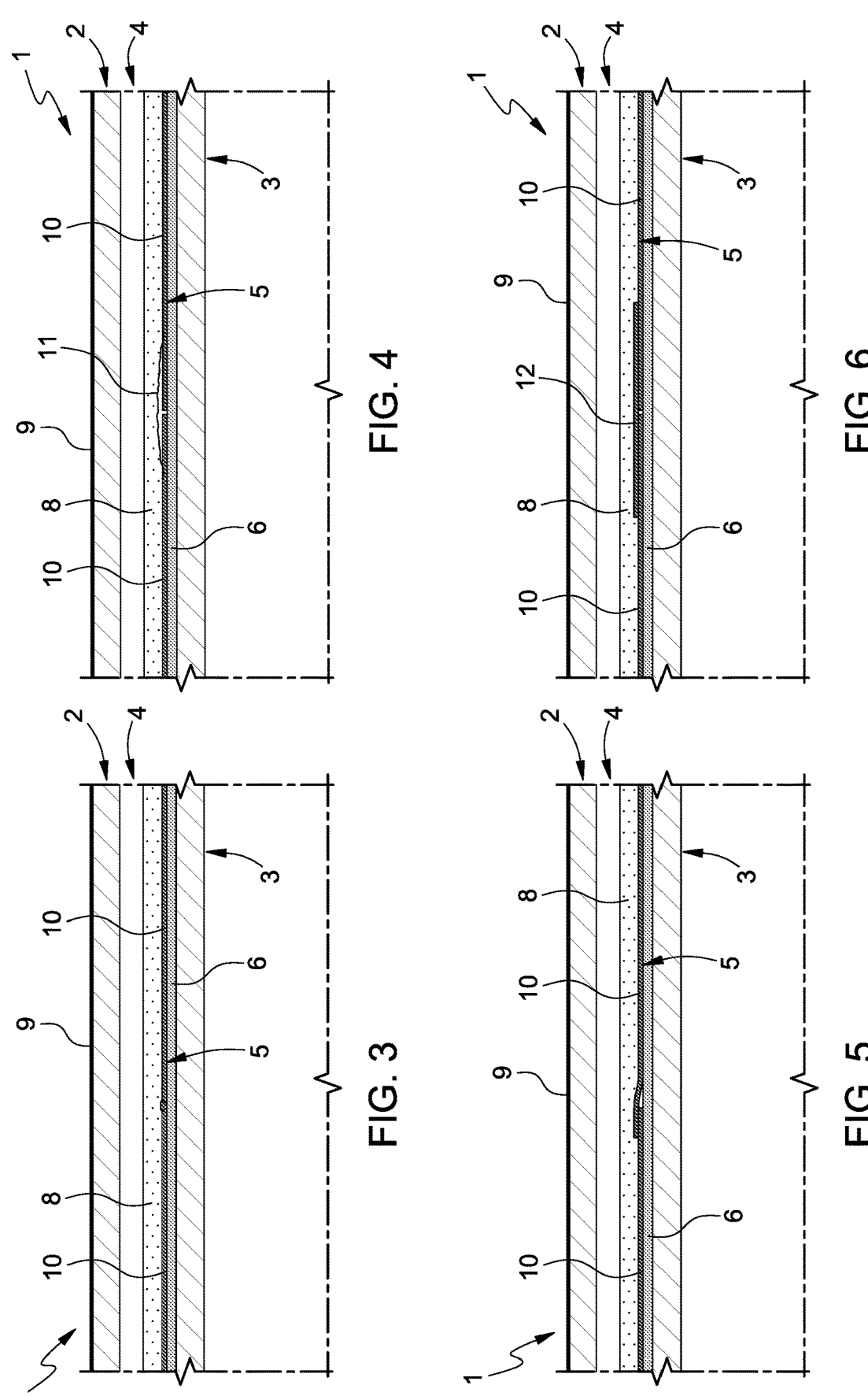
FIGS. 3 to 6 are longitudinal section views, on an enlarged scale and with parts removed for clarity's sake, of a constructive detail of the system of FIG. 1 and relative variants.

With reference to FIG. 3, the electrically conductive layer 5 is made by electrically conductive sheets 10 and generally of aluminium with a thickness ranging from a few tenths of a millimeter to a few millimeters. The sheets 10 of discrete length are wrapped around the pipeline 3 and are arranged adjacent to each other but need to be joined in the longitudinal direction to ensure electrical continuity.

In the case shown in FIG. 3, the sheets 10 are joined by welding or brazing.

In the variant of FIG. 4, the electrical continuity between the adjacent sheets 10 is achieved by connecting elements 11, the opposite ends of which are in contact with two adjacent sheets 10.

In the variant of FIG. 5, the electrical continuity of the electrically conductive layer 5 is ensured by the partial overlapping of the ends of the adjacent sheets 10.

In the variant of FIG. 6, the electrical continuity is ensured by connecting elements 12 which in this case are additional sheets of reduced length and overlapped on the ends of the adjacent sheets 10.

With reference to FIGS. 1 and 2, annular spacers 13 are arranged between the pipelines 2 and 3 and the function of which is to keep the pipelines 2 and 3 substantially coaxial; and annular shear stops 14, the function of which is to limit the relative longitudinal displacements between the pipelines 2 and 3, that is, the relative displacements substantially parallel to the axis A1.

In the case shown, each annular spacer 13 is arranged in support on the electrically conductive layer 5 and is arranged to be in contact with the internal face of the pipeline 2.

Each annular shear stop 14 adheres to the pipeline 2 and to the pipeline 3 and breaks the continuity of the electrically conductive layer 5.

Figures 7, 8, 9, 10, 11:
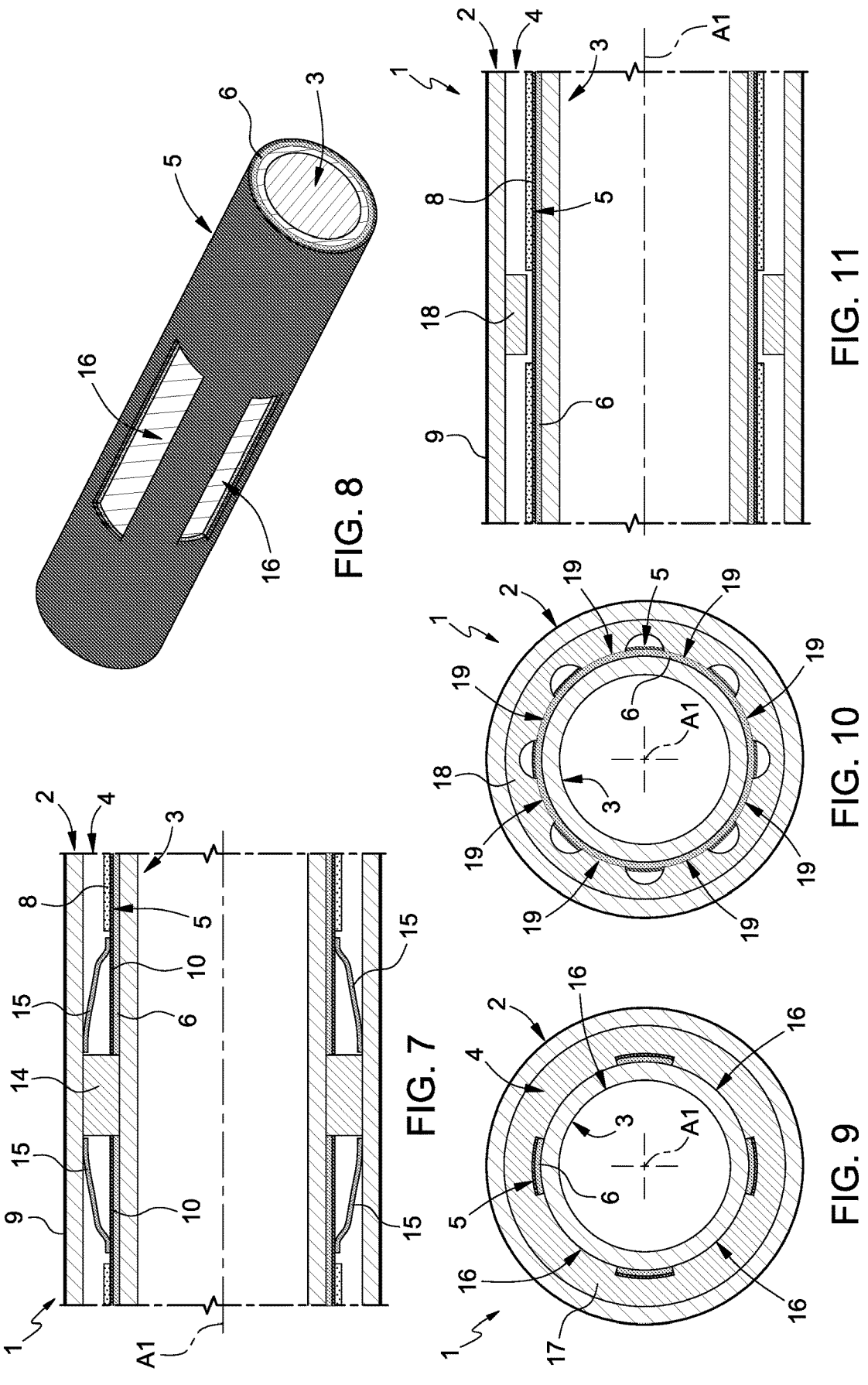
FIG. 7 is a longitudinal sectional view, with parts removed for clarity's sake, of a detail of the system of FIG. 1.
FIG. 8 is a perspective view, with parts removed for clarity's sake, of a variant of the detail of FIG. 7.
FIG. 9 is a cross-sectional view, with parts removed for clarity's sake, in accordance with the variant of FIG. 8.
FIG. 10 is a cross-sectional view, with parts removed for clarity's sake, of a further variant of the detail of FIG. 7.
FIG. 11 is a longitudinal section view, with parts removed for clarity's sake, of the further variant of FIG. 10.

In the detail shown in FIG. 7, annular shear stops 14 are shown which are arranged directly in contact with both pipelines 2 and 3, in particular adhering to the pipelines 2 and 3. In this case, the continuity of the electrically conductive layer 5 is broken, which is connected to the pipeline 2 by connecting elements 15 made of electrically conductive material.

An alternative solution to ensure the electrical continuity of the electrically conductive layer 5 consists in making windows 16 in the electrically conductive layer 5 and in the electrically insulating layer 6, as shown in FIG. 8, and in making an annular shear stop 17 by casting which grips the external surface of the pipeline 3 at the windows 16 as shown in FIG. 9.

A further alternative solution shown in FIGS. 10 and 11 provides for making an annular shear stop 18 with a grooved internal face which grips the pipeline 3 at windows 19 formed along the electrically conductive layer 5 while the grooved parts ensure the continuity of the electrically conductive layer 5.

Figures 12, 13, 14:
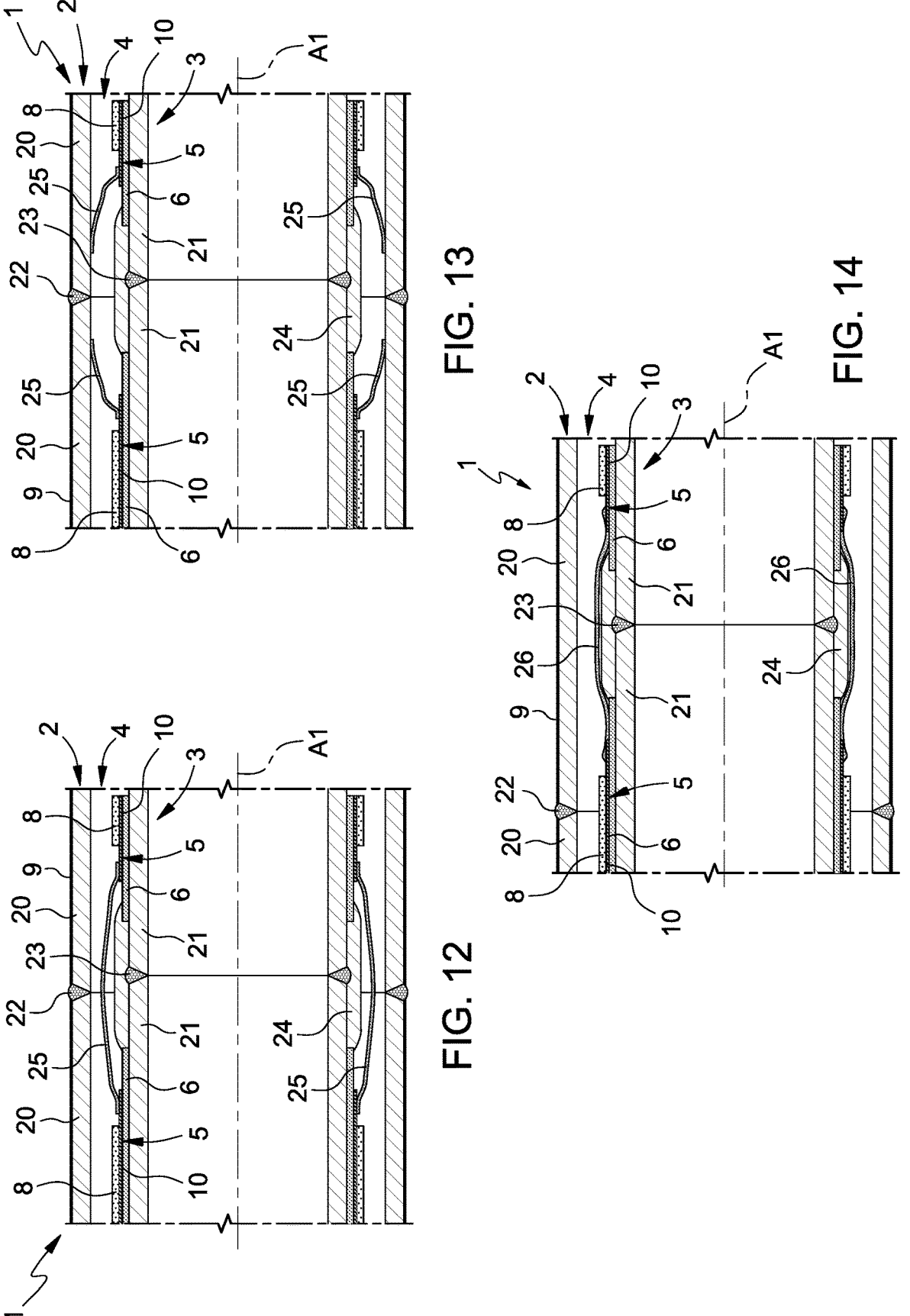
FIGS. 12, 13 and 14 are longitudinal section views, with parts removed for clarity's sake, of respective variants of a further constructive detail of the system of FIG. 1.

With reference to FIG. 12, the pipelines 2 and 3 are formed by respective pipes 20 and 21 of unitary length, generally 12 meters, which are joined to each other at their opposite ends through respective welding seams 22 and 23. Along the pipeline 3, the electrically insulating layer 6, the electrically conductive layer 5 and the thermally insulating layer 8 are interrupted at the opposite ends of each pipe 21. After joining the pipes 21, the continuity of the electrically insulating layer 6 is restored by a sleeve 24 made of polymeric material around the free ends of the pipes 21. Subsequently, the electrical continuity is achieved between the electrically conductive layers 5 of two adjacent tubes 21 by connecting elements 25 fixed to the adjacent electrically conductive layers 5. Finally, the two adjacent pipes 20 are welded the one to the other.

In the variant of FIG. 13, the connecting elements 25 connect an electrically conductive layer 5 to the corresponding pipe 20. In this way, the pipeline 2 ensures the electrical continuity along the system 1.

In the variant of FIG. 14, the system 1 comprises a connecting element 26, which is a strip of sheet of conductive material applied above the welding seam 23 which electrically connects the layers of conductive material 5 arranged astride the welding seam 23.

Figures 15, 16, 17:
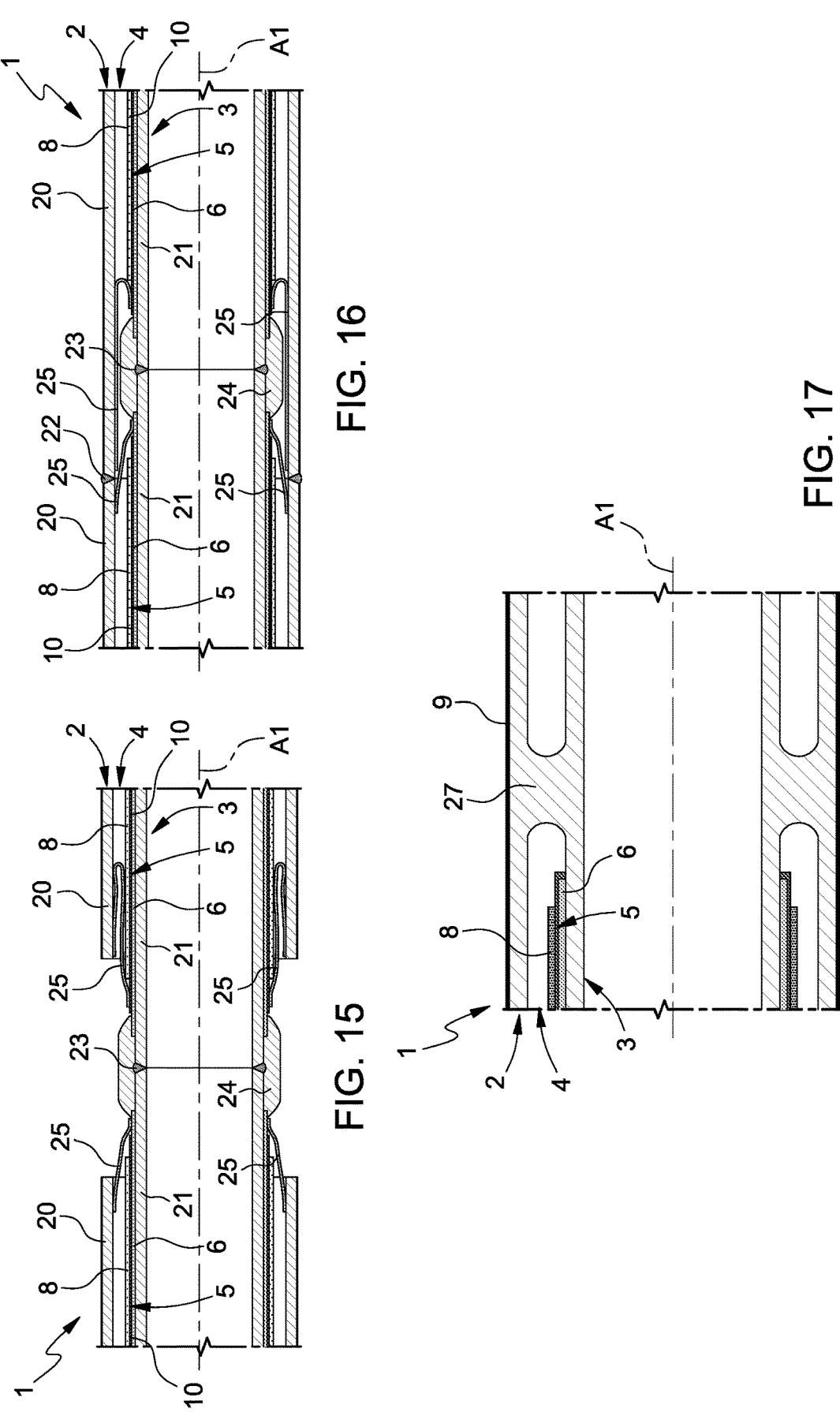
FIGS. 15 and 16 are longitudinal section views, with parts removed for clarity and on a reduced scale, of a further variant of the detail of FIG. 13
FIG. 17 is a longitudinal section view, with parts removed for clarity's sake, of a detail of the system of FIG. 1.

The variant of FIGS. 15 and 16, shows a solution similar to that of the variant of FIG. 13 and in which the connecting elements 25 are sufficiently long and flexible to allow or enable the axial sliding of at least one of the two pipes 20 so as to allow or enable the restoration of the continuity of the electrically conductive layer 5 obtained by the welding seam 22 in a relatively simple and fast manner.

With reference to FIG. 17, the system 1 comprises a bulkhead 27 of electrically conductive material, which is arranged at the ends of the pipelines 2 and 3 and is configured to ensure the closure of the electrical circuit by putting the pipelines 2 and 3 in contact.

In use, with reference to FIG. 1, the pipeline 2 and the electrically conductive layer 5 are earthed, while a potential difference is applied to the pipeline 3, on the one hand, and to the electrically conductive layer 5 and to the pipeline 2, on the other hand, at the central part of the system 1.

The thermal energy generated by Joule effect along pipeline 3 is transferred to the fluid. Some of the heat generated by Joule effect along the electrically conductive layer 5 is also confined towards the fluid based on the thermally insulating layer 8 arranged around the electrically conductive layer 5. Although the electrically conductive layer 5 and the pipeline 2 are connected in parallel, the lower resistance of the electrically conductive layer 5 results in most of the current to cross the electrically conductive layer 5, significantly limiting the thermal energy losses in the environment outside the system 1.

This increases the efficiency of system 1 because the generation of heat by Joule effect is concentrated at the pipeline 3 through which the fluid flows.

In some variants of the embodiment described, when the continuity of the electrically conductive layer 5 is broken, a by-pass is made through the pipeline 2 which, as already mentioned, is subject to the same potential as the electrically conductive layer 5.

Figures 18, 19:
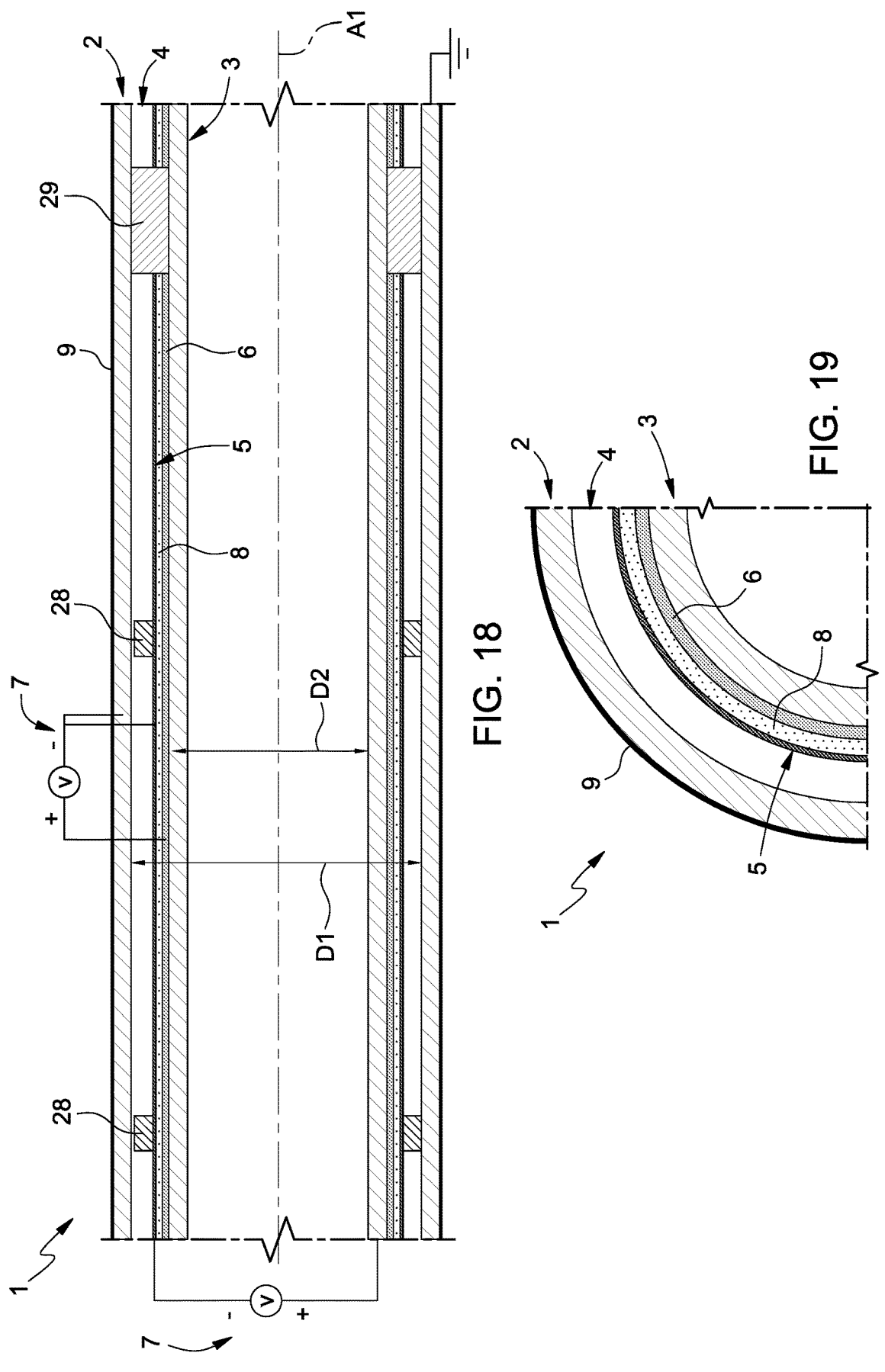
FIG. 18 is a longitudinal sectional view, with parts removed for clarity's sake, of a system to convey fluids realized in accordance with a second embodiment of the present disclosure.
FIG. 19 is a cross-sectional view, with parts removed for clarity's sake, of the system of FIG. 18.

In the embodiment of FIGS. 18 and 19, the thermally insulating layer 8 is applied on the electrically insulating layer 6 and the electrically conductive layer 5 is applied on the thermally insulating layer 8. The system 1 comprises annular spacers 28 arranged in contact with the electrically conductive layer 5, and annular shear stops 29, which adhere to the pipeline 2 and to the pipeline 3 and break the continuity of the electrically conductive layer 5.

This embodiment of the disclosure has a lower efficiency because the thermally insulating layer 8 does not coat the electrically conductive layer 5.

Finally, it is evident that variations with respect to the embodiments described can be made to the present disclosure without however departing from the scope of protection of the claims. That is, the present disclosure also covers embodiments that are not described in the detailed description above as well as equivalent embodiments that are part of the scope of protection set forth in the claims. Accordingly, various changes and modifications to the presently disclosed embodiments will be apparent to those skilled in the art.

The invention claimed is:

1. A system to convey a fluid, the system comprising:
   a first pipeline made of an electrically conductive material and having an internal diameter;
   a second pipeline made of an electrically conductive material and having an external diameter smaller than the internal diameter of the first pipeline, the second pipeline being positioned inside the first pipeline at a distance from the first pipeline to define an annular gap between the first pipeline and the second pipeline;
   an electrically conductive layer positioned in the annular gap at a distance from the first pipeline, the electrically conductive layer being in electrical contact with the first pipeline;
   an electrically insulating layer positioned between the second pipeline and the electrically conductive layer; and
   a power source configured to apply an electrical potential difference between the second pipeline and the electrically conductive layer.

2. The system of claim 1, further comprising a thermally insulating layer positioned in the annular gap and around the second pipeline.

3. The system of claim 2, wherein the thermally insulating layer coats the electrically conductive layer.

4. The system of claim 2, wherein the thermal insulating layer coats the electrically insulating layer.

5. The system of claim 4, wherein the electrically conductive layer coats the thermally insulating layer.

6. The system of claim 1, wherein the electrically insulating layer coats an outer surface of the second pipeline.

7. The system of claim 6, wherein the electrically conductive layer coats the electrically insulating layer.

8. The system of claim 1, wherein the power source comprises a voltage generator.

9. The system of claim 1, wherein the electrically conductive layer comprises a plurality of electrically conductive sheets longitudinally positioned side-by-side in the annular gap between the first pipeline and the second pipeline, the electrically conductive sheets being coupled together by at least one of: welding, brazing, partially overlapping, and electrically conductive connecting elements.

10. The system of claim 1, further comprising:
    a plurality of first pipes joined together at respective opposite ends by first welding seams to form the first pipeline;
    a plurality of second pipes joined together at respective opposite ends by second welding seams to form the second pipeline; and
    a connecting element made of an electrically conductive material and arranged at each second welding seam, the connecting element being configured to electrically connect two electrically conductive sheets arranged at opposite sides with respect to the second welding seam.

11. The system of claim 10, wherein each connecting element is in contact with two electrically conductive sheets arranged at opposite sides with respect to the second welding seam.

12. The system of claim 10, further comprising at least two connecting elements, each of the at least two connecting elements being in contact with a respective electrically conductive sheet and with the first pipeline.

13. The system of claim 10, further comprising a sleeve wrapped around the second welding seam and free ends of two adjacent pipes.

14. The system of claim 1, further comprising a plurality of annular spacers arranged between the first pipeline and the second pipeline to space the first pipeline and the second pipeline.

15. The system of claim 14, wherein each annular spacer is positioned between the electrically conductive layer and the first pipeline.

16. The system of claim 1, further comprising a plurality of annular shear stops positioned between the first pipeline and the second pipeline and configured to limit relative longitudinal displacement between the first pipeline and the second pipeline.

17. The system of claim 16, wherein each annular shear stop breaks a continuity of the electrically conductive layer and the system further comprises a plurality of connecting elements connected to the electrically conductive layer and to the first pipeline at opposite sides of each annular shear stop.

18. The system of claim 16, wherein each annular shear stop defines a plurality of openings to corresponding to a continuity of the annular gap along a longitudinal axis of the first pipeline and the second pipeline.

19. The system of claim 16, wherein each annular shear stop has a plurality of portions arranged in support on the electrically conductive layer.

\*  \*  \*  \*  \*